United States Patent [19]

Brooks et al.

[11] 4,340,409
[45] Jul. 20, 1982

[54] METHOD OF FABRICATING A PRESSURE SENSOR

[75] Inventors: Mark A. Brooks, Sterling Hts.; Jane Miler, Troy, both of Mich.

[73] Assignee: The Bendix Corporation, Southfield, Mich.

[21] Appl. No.: 233,370

[22] Filed: Feb. 11, 1981

Related U.S. Application Data

[63] Continuation of Ser. No. 30,588, Apr. 16, 1979, abandoned.

[51] Int. Cl.$^3$ .............................................. C03B 23/20
[52] U.S. Cl. ........................................... 65/43; 65/58; 65/59.21; 65/59.23; 73/718; 73/724; 361/283
[58] Field of Search .................... 65/36, 42, 43, 45, 58, 65/59.21, 59.23; 73/718, 724; 361/283

[56] References Cited

U.S. PATENT DOCUMENTS

| | | | |
|---|---|---|---|
| 2,279,854 | 4/1942 | Whitney . | |
| 3,239,323 | 3/1966 | Folweller | 65/43 X |
| 3,687,650 | 8/1972 | Case et al. | 65/58 X |
| 3,805,368 | 4/1974 | Eberhard et al. | 73/410 X |
| 4,177,496 | 12/1979 | Bell et al. | 73/724 X |
| 4,184,189 | 1/1980 | Davis et al. | 65/43 X |
| 4,287,553 | 9/1981 | Braunlich | 73/724 X |

FOREIGN PATENT DOCUMENTS

| | | |
|---|---|---|
| 783005432 | 10/1978 | European Pat. Off. . |
| 2021479 | 11/1971 | Fed. Rep. of Germany . |
| 2706505 | 10/1977 | Fed. Rep. of Germany . |
| 2820478 | 11/1978 | Fed. Rep. of Germany . |
| 989771 | 5/1951 | France . |
| 2344006 | 10/1977 | France . |

*Primary Examiner*—Arthur D. Kellogg
*Attorney, Agent, or Firm*—Markell Seitzman; Russel C. Wells

[57] ABSTRACT

A pressure sensor including a pressure capsule such as a dual diaphragm quartz capacitance pressure capsule and structure for supporting and sealing same within the pressure environment to be measured. The pressure capsule having two parallel quartz plates spaced by a dielectric ring forming a vacuum chamber therein. The structure providing a force balanced support for compressively loading the pressure capsule through the dielectric ring. The structure further having transfer port therein to communicate the pressure environment to both plates.

The method of making the quartz capacitive pressure capsule includes the steps of surface preparation, preglazing of the component parts and vacuum sealing by utilizing a controlled pressure-temperature profile.

A registration fixture is described which contains a plurality of flat plates, each plate having a pressure capsule receiving cavity sized to closely receive one of the quartz plates and further provides a uniform temperature radiation pattern for sealing of the pressure capsule during the controlled pressure-temperature profile.

17 Claims, 16 Drawing Figures

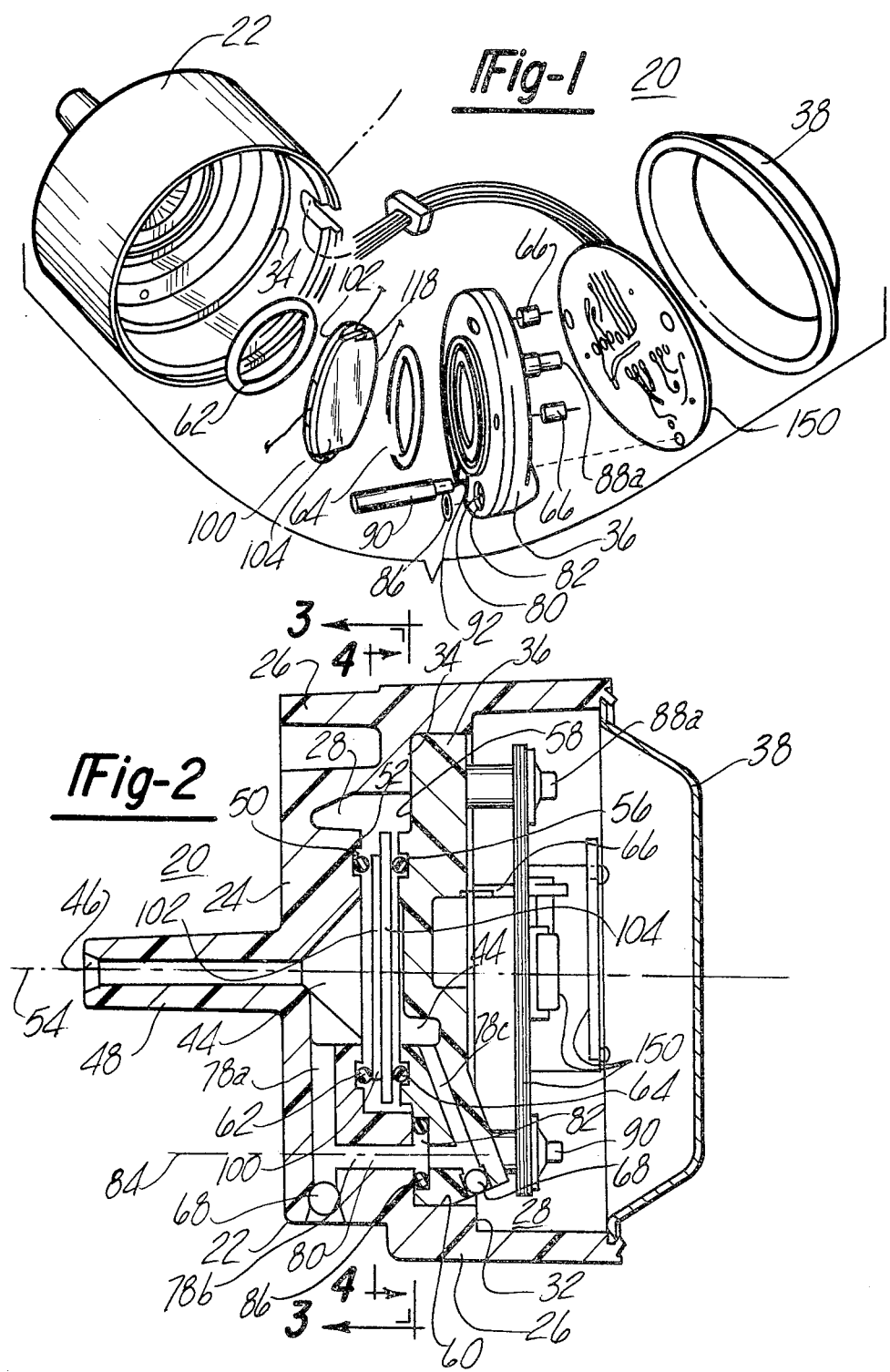

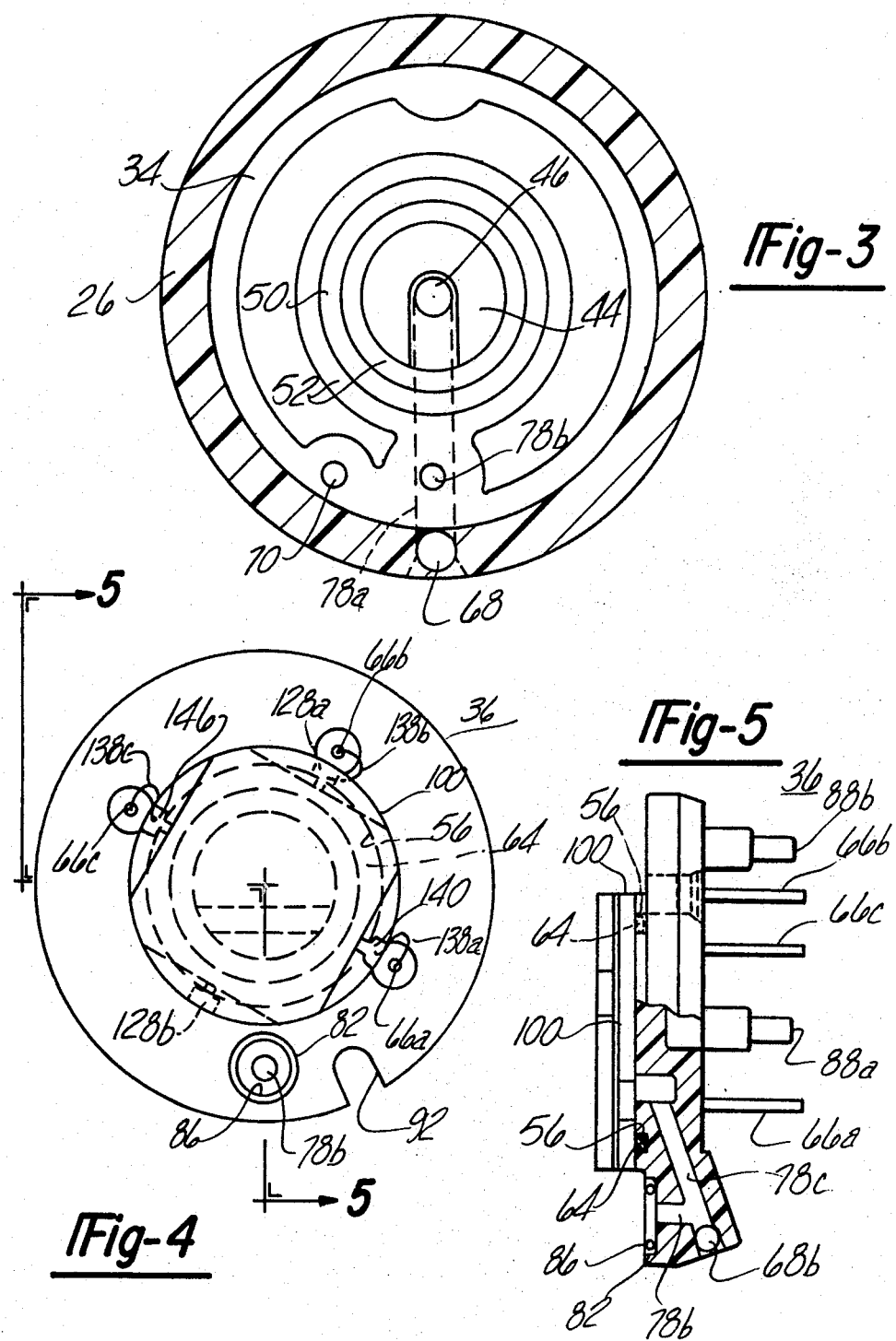

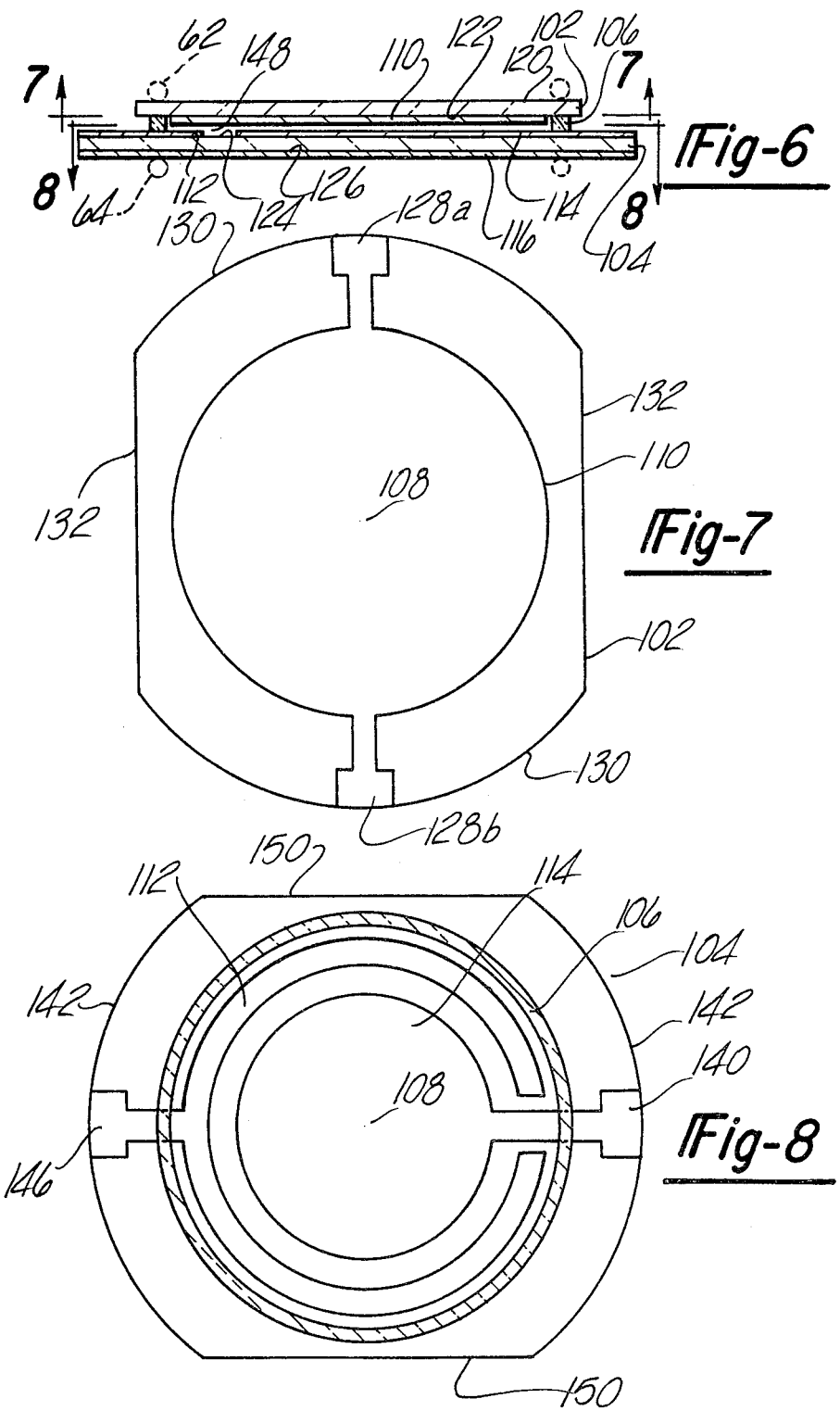

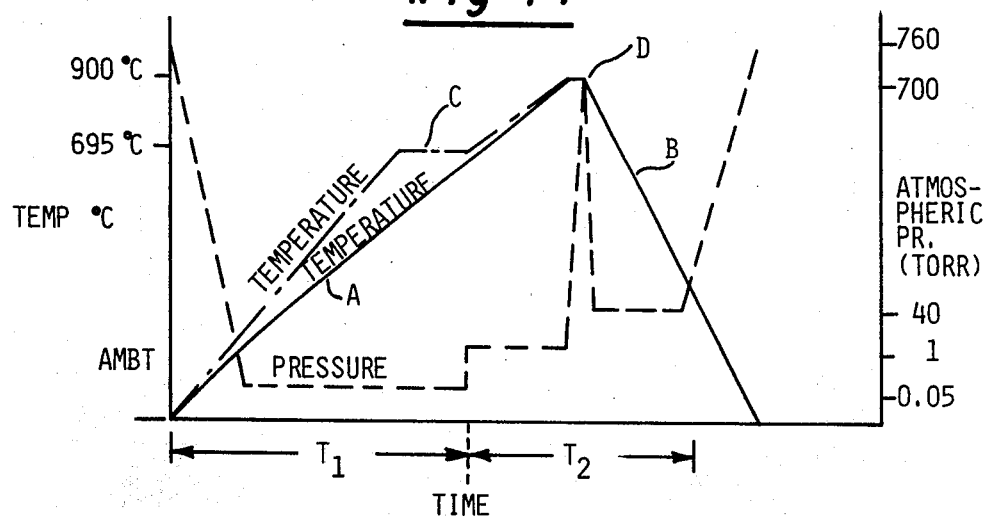
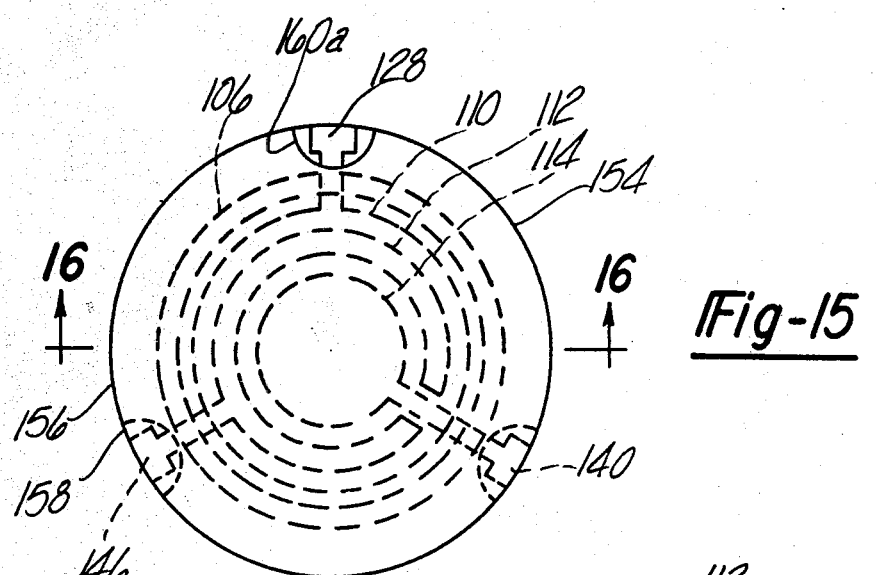
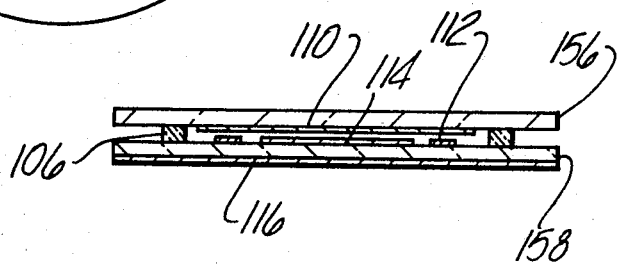

METHOD OF FABRICATING A PRESSURE SENSOR

This is a continuation of application Ser. No. 30,588 filed Apr. 16, 1979, now abandoned.

BACKGROUND AND SUMMARY OF THE INVENTION

The invention relates to a method of fabricating a quartz capacitance pressure capsule. More particularly, the invention relates to a method of surface preparation, electrode curing and vacuum sealing of the parallel plates of the pressure capsule.

The incorporation of pressure sensors into the electronic control systems of automotive vehicle poses severe operational requirements for the pressure sensor. These requirements are further heightened when the pressure sensor is used to measure the manifold pressure (MP) or the absolute manifold pressure (MAP) of the engine.

The pressure sensor must operate in a mobile and severely and hostile environment which may include any of the following characteristics: varied temperature extremes, excessive shock and vibration and high levels of radiation causing electromagnetic interferences and corrosive gases and liquids. The pressure proximate the intake manifold is rapidly changeable and susceptable to large variations in magnitude (1-4 atmospheres) which may be caused as the result of explosive backfire or may occur if the vehicle is so equipped during the boost phase of the operation of a supercharger or turbocharger; thus requiring a pressure sensor having a large dynamic range and high sensitivity. Irrespective of the above, if the present invention is utilized in the automobile, the requirements of the industry dictate that it must be (1) inexpensive; (2) repeatable; and (3) capable of being mass produced which implicityly requires the use of novel and inexpensive fabrication techniques as opposed to the ion-milling, vacuum deposition methods such as sputter-etching techniques and brazing fabrication steps mentioned by Polye in U.S. Pat. No. 3,858,097, and by Dias, et al in U.S. Pat. No. 4,064,550.

The present invention is a method of fabricating a dual diaphragm quartz capacitance pressure capsule. The pressure capsule comprises a pair of flat flexible fused quartz plates which are separated by a ring of dielectric material (such as a glass frit) defining an interior chamber which is maintained at a determinable pressure (vacuum) reference level. The pressure capsule contains a plurality of electrodes located within the interior chamber forming the conducting plates of a reference capacitor $C_r$ and a pressure sensing capacitor $C_p$. In particular, one plate, the upper plate contains a ground electrode while the other plate, i.e., the lower plate contains both the $C_p$ and $C_r$ electrodes. The lower plate may also contain an electrical shield on a surface opposite the internal chamber. In addition, the pressure capsule contains a plurality of electrical contacts, one associated with each of the above electrodes. These contacts are located outside of the internal chamber near the edges of each of the flat plates. The method comprises the steps of (a) preparing the surface of each quartz plate to a determinable flatness; (b) printing the electrodes and electrical contacts thereon using a metal organic ink; (c) curing the electrodes by heating and controlling the temperature profile to remove the organic binders within the ink and to cause the remaining metals to bind or adhere to the quartz plates; (d) printing a slurry glass frit, i.e., the dielectric ring thereon; (e) preglazing the frit to remove non-glass materials in the frit to minimize the formation of a bubble structure developed in later steps; (f) assembling the quartz plates within a registration fixture to form an unsealed pressure capsule or plurality of capsules; and (g) vacuum sealing the unsealed capsule comprising the steps of varying the local temperature and pressure in accordance with a described temperature-pressure profile shown in FIG. 12.

In response to pressure input thereto, both plates act as cantilevered plates, and deflect and bend over the raised dielectric ring varying the capacitance between the plates.

The housing includes means for circumferentially sealing and compressively supporting both plates wherein the compressive forces on the plates are opposingly directed through the dielectric ring. The housing further includes means, such as a port, for communicating the pressure to be sensed to the upper plate proximate the general location of the interior chamber and transfer port means located therein to further communicate the pressure to the second plate.

An advantage of the present invention is that capsule to capsule uniformity is enhanced by minimizing developed bubble structures. In addition, the depositing of electrodes and dielectric material by silk screening permits the achievement of a low cost fabrication process. A further advantage of the process is that pressure capsules having different spacing i.e., capacitance can be achieved. This can be seen from the following: During the vacuum sealing of the capsule, the dielectric is caused to return to a molten, viscous state and by increasing the local pressure, a clamping force is applied to both plates. It can be appreciated that the spacing therebetween will vary with the maximum applied pressure (force) and its time of application.

It is an object of the present invention to fabricate quartz capacitors having a uniform bubble structure in its electrodes and dielectric components.

It is an object of the present invention to seal a pressure capsule in a controlled temperature pressure (vacuum) environment.

It is an object of the present invention to provide a pressure capsule having an internal pressure (vacuum) reference and to eliminate the need for vacuum tip-offs.

It is a further object of the present invention to eliminate the need for heavy hold down weights and large thermal masses used during the sealing process.

It is an additional object of the present invention to provide a method of fabrication adaptable to the mass production of quartz pressure capsules.

These and other objects, features and advantages of the invention will be clear from the detailed description of the drawings.

BRIEF DESCRIPTION OF THE DRAWINGS

In the drawings:

FIG. 1 is an exploded view of the preferred embodiment of a pressure sensor.

FIG. 2 is a sectional view of the pressure sensor.

FIG. 3 is a sectional view through Section 3—3 of FIG. 2 with portions of the pressure sensor removed.

FIG. 4 is a sectional view taken through Section 4—4 of FIG. 2 with housing 22 removed.

FIG. 5 is a partial sectional view through Section 5—5 of FIG. 4.

FIG. 6 is a sectional view of the pressure capsule.

FIG. 7 is a bottom view of the upper disc of the pressure capsule taken through Section 7—7 of FIG. 6.

FIG. 8 is a top view of the lower disc of the pressure capsule taken through Section 8—8 of FIG. 6.

FIG. 14 illustrates the temperature-pressure sealings process.

FIG. 15 illustrates an alternate embodiment of the pressure capsule.

FIG. 16 illustrates a sectional view taken through Section 16—16 of FIG. 15.

DETAILED DESCRIPTION OF THE DRAWINGS

Figure 9:
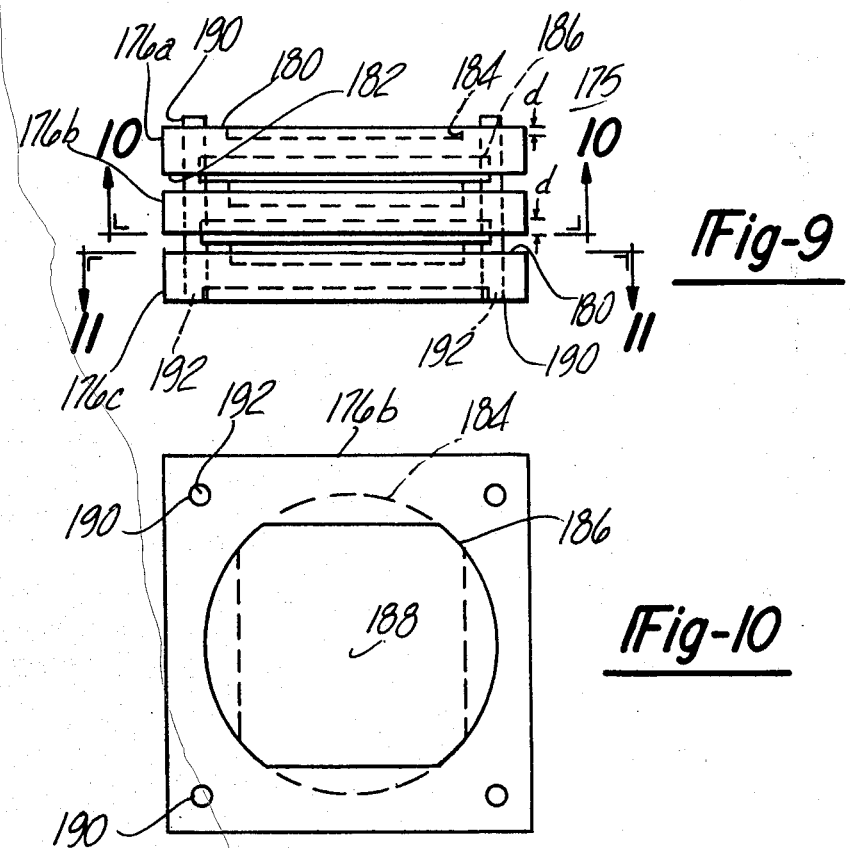
FIG. 9 is a sectional view of a registration fixture.

Reference is made to FIG. 1, which is an exploded view of the preferred embodiment of the capacitive pressure sensor 20. In particular, FIG. 1 illustrates the interrelationship of the primary components of the present invention. There is shown a cup-like housing 22, a base 36 and cover 38. The housing 22 and base 36 combine to protect, support and enclose a pressure capsule 100 which is suspended therebetween by a pair of o-rings 62 and 64. The base 36 is designed to seat against a circumferential shoulder 34 within the housing 22. The signal conditioning electronics 150 are suspended between the base 36 and cover 38 by three pedestals. Two of these pedestals 88a and b are integral parts of the base 36. The third pedestal is an electrically conductive post 90 which projects from the housing 22 and extends through a centering groove 92 in the base 36 providing the third leg of the three legged support for the signal conditioning electronics 150. Signal communication with the electronics 150 is through a plurality of pins 66 in the base 36. As will be discussed later, post 90, in addition to supporting the electronics, provides an improved electrical ground connection linking the housing 22, base 36 and electronics 150. In the preferred embodiment, the housing 22 is fabricated of an electrically conductive material such as aluminum, or carbonized plastic which cooperates with the components of the pressure capsule 100 to isolate pressure measurements from stray electric fields. The base 36 may similarly be fabricated of metal or alternatively of a nonconductive material such as a thermo-set plastic or carbonized plastic having the required number of electrical pins 66 extending therethrough. These and other features of the present invention will be discussed in more detail in the accompanying figures.

FIG. 2 is a sectional view of the assembled pressure sensor 20, further illustrating the relationship between the housing 22, base 36, pressure capsule 100 and its associated signal conditioning electronics 150. The housing 22 includes a bottom 24 and a walled portion 26 protruding therefrom defining a cup-like cavity 28. The housing 22 has two circumferential shoulders 32, 34 surrounding the cavity 28, located on the interior portion of the cylindrical wall 26 and spaced from the bottom 24 of the housing 22. The shoulder 34 provides a means for circumferentially supporting the base 36. The base 36 is a disc-like member comporting to the substantially circular dimensions of the interior of wall 26 and to the dimensions of the circumferential shoulder 34. The exterior dimensions of the base 36 may be chosen to provide for a press fit engagement between the interior of the wall 26 and the base 36 or may be sized to be staked in place at the base 36-shoulder 32 interface (staking not shown). When the base 36 is mounted within the housing 22, it is spaced from the bottom 24 forming a pressure receiving cavity 44 therebetween. The pressure receiving cavity 44 is the innermost portion of the cup-like cavity 28. The pressure receiving cavity 44 is vented to an external working pressure through an input passage 46 located within the bottom 24 of the housing. As illustrated, the input passage 46 is located within a pressure received port 48 which protrudes from the bottom 24 of the housing 22.

The housing 22 and base 36 cooperate to support the pressure capsule 100 within the pressure receiving cavity 44. The housing 22 is fabricated with a circular groove 50 formed in a surface 52 of the bottom 24 adjacent to the pressure receiving cavity 44. In the embodiment shown in FIG. 2, the groove 50 is coaxial to an axis 54 which runs through the center of the input passage 46. In addition, the base 36 is fabricated with a similar groove 56 which is located on a surface 58 of the base 36 adjacent to the pressure receiving cavity 44. In the assembled state with the base 36 seated upon the shoulder 34, the second groove 56 will be located coaxial to axis 54 and immediately below but spaced apart from groove 50. The significance of this spacing will be discussed later. It is a requirement of the invention that grooves 50 and 56 be in registration with one another, thus necessitating a means of aligning both grooves. This is done in the preferred embodiment in a straight forward manner and is accomplished by controlling the tolerances between the base 36 and the interior of the wall 26, i.e. shoulders 32 and 34. The groove 56 is formed in the base 36 concentric to its edge 60 therein permitting the required accuracies upon assembly. The coacting set of grooves 50 and 56 are sized to accept identical pairs of o-rings 62 and 64 for supporting the pressure capsule 100. It can be seen that by requiring the alignment of the grooves 50 and 56 the clamping or compressive force exerted on the pressure capsule 100 will be directed substantially through the centers of the grooves 50 and 56. The degree of compressive force exerted on the pressure capsule 100 is determined by the spacing between the parallel surfaces 52 and 58. The o-rings 62 and 64 in cooperation with the base 36 and housing 22 provide a means for resiliently supporting the pressure capsule 100, and means for force balancing the pressure capsule 100 wherein equal and opposite compressive forces are imparted to opposing surfaces of the pressure capsule 100. The o-rings (62, 64) also provide a pressure tight seal for the pressure receiving cavity 44 which is exposed to the working pressure environment, therein isolating it from the remaining portions of the cup-like cavity 28. The isolation of the pressure receiving cavity 44 has further significance in the following context. As will be described later, the pressure capsule 100 is a capacitive pressure capsule comprising two parallel quartz plates (102, 104) having a plurality of electrodes (110, 112, 114) imprinted thereon. Electrical communications between the signal conditioning electronics 150 and the pressure capsule 100 are through a plurality of electrical contacts (128, 146) which are located about the periphery of the pressure capsule 100. Thus, as shown, the o-rings (62, 64)

isolate these electrical contacts from the working pressure environment. This is quite significant as can be seen by the following: One use of the present invention is to measure the absolute pressure in the intake manifold of an internal combustion engine. In this context corrosive gases will be input into the pressure receiving port 48. In addition, if the engine has a turbo or supercharger, there may be intervals during the operation of the engine wherein raw fuel will be input into the pressure receiving port 48, therein further illustrating the need to isolate the electrical contacts from the pressure receiving cavity 44. Electrical communication between the electrical contacts (128, 146) of the pressure capsule 100 and its associated pressure sensor electronics 150 is through a plurality of electrically conductive pins 66 which are imbeded in and extend through the base 36. Additional sealing between the base 36 and housing 22 and protection for the electronics 150 can be achieved by filling that portion of the cavity 28 which houses the electronics 150 (between the base 36 and cover 38) with a sealing material such as Humiseal manufactured by Columbia-Chase, Woodside, N.Y.

As previously discussed, the present invention provides the working pressure environment to both surfaces of the pressure capsule 100. This is accomplished by providing the base 36 and bottom 24 with a plurality of intersecting passages 78a, b, c which together comprise a transfer port 80 for transferring the working environment to both pressure receiving surfaces of the pressure capsule 100. Inasmuch as the pressure within the transfer port 80 will be that of the working pressure environment it is necessary to provide a pressure tight seal about that portion of the transfer port 80 at the juncture of the base 36 and shoulder 34. This is accomplished by providing the base 36 with a groove 82, coaxial to a center line 84 through the passage 78b, which is sized to accept an o-ring 86. In this manner upon assembly, the base 36 will compress the o-ring 86 against the shoulder 34 of the housing 22 therein providing a pressure tight seal of the transfer port 80. Similarly, passages 78a and 78c must also be sealed. The required pressure tight seal can be accomplished by welding, sealing or epoxying at locations 68 at the ends of the respective passages 78a and 78c.

Reference is now made to FIG. 3 which is a sectional view taken through section 3 of FIG. 2 with the base 36, pressure capsule 100 and o-ring 62 removed. The post 90 has also been omitted to show the post receiving hole 70 more clearly. FIG. 3 further illustrates the location of the transfer port 80 formed by passage 78b.

Reference is made to FIG. 4 which is a sectional view taken through Section 4—4 of FIG. 2 with the housing 22 removed and further illustrates the mounting relationship between the pressure capsule 100 and the base 36. A detailed description of the pressure capsule 100 can be found in the discussion of FIGS. 6 through 8. It is sufficient for discussion of FIG. 4 to visualize the pressure capsule 100 as a substantially circular structure which is coaxially mounted relative to the center of base 36 and axis 54 of the housing 22. FIG. 4 also illustrates the relationship between the electrical contacts (128, 140, 146) of the pressure capsule 100 and the plurality of electrical pins 66 extending through the base 36. The contacts 128, 140, and 146 are connected to pins 66a, b, and c through a plurality of electrical leads 138a, b, and c. The top view of the base permits easy recognition of a portion of the transfer port 80, in particular, passage 78b, with its coacting pressure tight seal, i.e. o-ring 86, located within groove 82. In addition, the alignment slot 92, the relationship of groove 56 to its coacting o-ring 64 and to the geometries of the pressure capsule 100 are readily discernable.

FIG. 5 is a side view of the base 36 with the electronics 150 removed and also contains a partial sectional view illustrating the details of the transfer port 80. FIG. 5 more clearly illustrates the relationship of the pedestals 88a and b and the relationship of pins 66a through 66c to the other components of the base.

Figure 10:
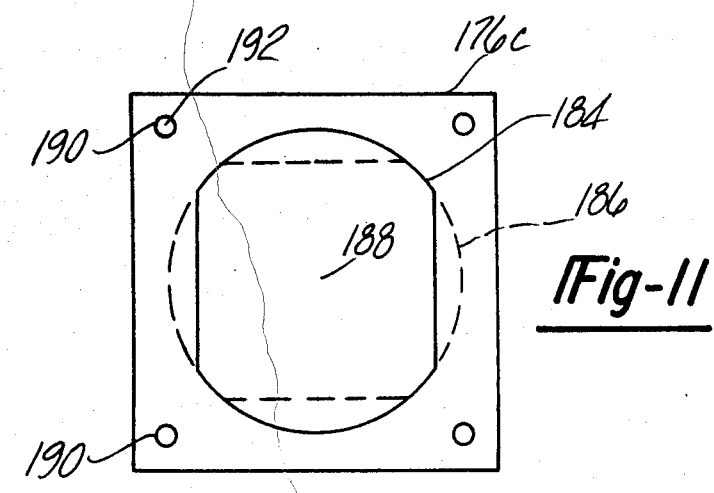
FIG. 10 is a sectional view through Section 10—10 of FIG. 9.
Figure 11:
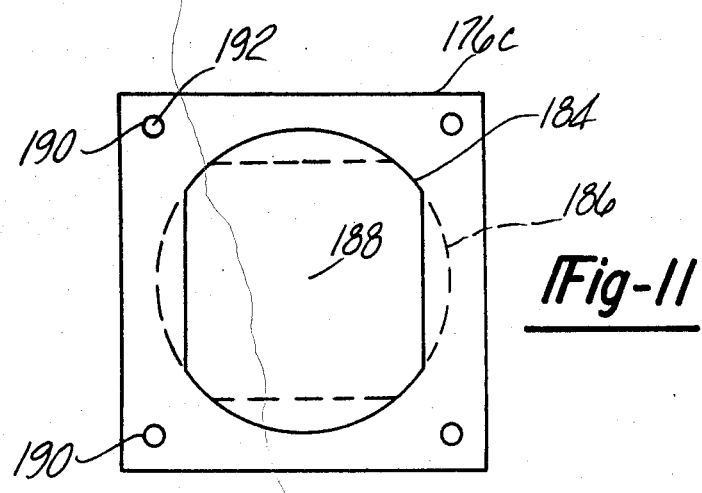
FIG. 11 is a sectional view through Section 11—11 of FIG. 9.

FIGS. 6, 7, and 8 illustrate the details of the pressure capsule 100. The pressure capsule 100 comprises a dual diaphragm having two coaxially oriented oblong non-conductive flexible plates or discs which are preferably fabricated from fused quartz. As will be described later, each plate or disc of the assembled capsule 100 is rotated relative to one another about their common centers 108. The pressure capsule 100 consists of an upper plate or disc 102 and a lower plate or disc 104. Each disc is maintained in spaced relationship one to the other by a dielectric material such as a frit glass 106. The upper and lower discs 102 and 104 have the same physical shape and differ by the electrodes 110, 112, 114 and a ground shield 116 imprinted thereon. In the preferred embodiment, as illustrated in FIGS. 6-8 each quartz disc is a substantially circular member having flattened sides giving it a substantially oblong appearance. The flattened sides 132 and 150 may be viewed as cut-outs and provide a reference for alignment and for registration permitting the accurate placement of the electrodes and dielectric material thereon. The flattened sides 132, 150 or cut-outs also provides easy access to a plurality of electrical contacts 128, 140 and 146. In addition, the sides 132 and 150 or cut-outs in co-operation with a registration fixture 175, discussed in FIGS. 9, 10 and 11, provide a means for aligning the plates or discs 102 and 104 at a determinable orientation relative to each other prior to and during fabrication. Other plate shapes and cut-outs may be substituted in comformity with the teachings herein. The upper quartz disc 102 has an upper surface 120 and a parallel lower surface 122. In a similar manner, the lower quartz disc 104 has an upper surface 124 and a parallel lower surface 126. A substantially circular ground electrode 122 having two oppositely extending electrical contacts 128a and b is disposed on the lower surface 102. These electrical contacts extend across the larger dimension of disc 102 to its edge 130, as shown in FIG. 7.

Reference is made to FIG. 8 which illustrates the details of the lower quartz disc 104. The lower quartz disc 104 has a circular electrode 114 disposed on its upper surface which is electrically connected to its associated electrical contact 140. The electrical contact 140 is located on the circular or peripheral edge 142 of the lower quartz disc 104. In addition, the upper surface 124 contains a substantially circular ring or c-shaped electrode 112 which partially surrounds the smaller electrode 114. The c-shaped electrode 112 is in electrical communication with an associated contact 146 located at the periphery of the lower disc 104 and is oppositely situated relative to contact 140. Further inspection of FIG. 8 reveals the c-shaped outer electrode 112 is concentricly disposed relative to the inner electrode 114 and to electrode 110. The electrode combination 110–114 shall be designated as a pressure sensing capacitor $C_p$ while the electrode combination 110–112 shall be designated as the reference capacitor $C_r$. The diameter of the ground electrode 110 should be chosen equal to or greater than the diameter of the outer electrode 112. In the preferred embodiment, the ground electrode 110 has a diameter which is ten percent larger than the diameter of the outer electrode 112 and the areas of electrodes 112 and 114 are made equal yielding capacitances $C_p$ and $C_r$ which are substantially equal. The purpose of requiring the ground electrode 110 to be equal to or slightly greater than the diameter of the outer electrode 112 is to prevent the introduction of stray capacitance into the electrical measurements providing a degree of electromagnetic isolation for the pressure capsule 100. It can be seen that the capacitive capsule 100 is effectively shielded from electromagnetic radiation by the combined shielding effects of the ground electrode 110 and ground shield 116. In addition, the ground electrode 110 and ground shield 116 may be connected together by using a wire such as ground link 118 therein insuring that the ground electrode 110 and ground shield 116 remain at the same electric voltage potential.

FIG. 8 further illustrates the relationship between the dielectric frit glass 106 and the electrodes 110, 112 and 114. In particular, the frit glass 106 which spaces the two discs apart from one another is a circular ring and has a diameter greater than either of the diameters of electrodes 110, 112. In addition, the dielectric frit glass 106 forms a pressure tight seal for the interior chamber 148 therebetween. If the pressure capsule is to function as an absolute pressure sensing apparatus the interior chamber 148 must be evacuated. The process of evacuating the interior chamber is discussed in detail later. The degree of vacuum within the interior chamber 148 will depend upon the low range of the desired pressure sensitivity. Under certain circumstances, it might even be desirable to back fill the interior chamber 148 to a predetermined pressure or with an inert gas to achieve a degree of temperature compensation. Reference is again made to FIG. 6 which illustrates by use of phantom lines the relationship between o-rings 62 and 64 and the circular ring of frit glass 106. To achieve a forced balanced situation, it is required that the compressive forces exerted on the pressure capsule 100 by o-rings 62 and 64 be circumferentially applied directly above and below the frit glass 106.

Further inspection of FIGS. 6–8 reveal a unique technique, not limited to a capacitive capsule, of arranging the plurality of electrical contacts needed to communicate with the pressure capsule 100. Inasmuch as each quartz plate or disc (102, 104) has an oblong shape it is desirable to place the electrodes on the appropriate quartz disc at the dimensions of maximum distance from the center of each plate or disc. By rotating quartz plate 104, a determinable amount such a determinable amount such as 90° relative to quartz disc 102 it is apparent that the electrodes, which are located at the maximum distances from the center of each of the respective discs, will extend beyond the smaller dimensions of the substantially oblong discs. As previously mentioned, the preferred embodiment uses a substantially circular quartz disc having flattened sides, i.e. sides 132, 150, permitting the electrodes to extend beyond these flat areas for easy access.

The upper surface 120 of the upper quartz disc 102 and the ground shield 116 or the lower surface 126 of the lower disc 104 can be thought of as two pressure receiving surfaces and the areas of these pressure receiving surfaces interior to the diameter of the glass frit 106 may further be described as pressure responsive regions. The capacitive plates or discs 102, 104 will tend to deflect upon the application of the normal component of the pressure force being sensed at points interior to the support provided by the glass frit 106. A pressure capsule 100 having two pressure responsive regions yields a sensor having increased sensitivity when compared to a sensor employing a single pressure sensitive surface, that is, the use of two pressure responsive surfaces permits the use of a smaller pressure capsule 100 to achieve the same change capacitance output in comparison to a pressure sensor employing a single pressure responsive surface.

The deflections of the discs 102, 104 will cause a determinable change in the capacitance of the pressure capsule. Techniques for measuring this capacitance or change in capacitance are known in the art. One such scheme is shown by W. R. Polye in U.S. Pat. No. 3,858,097, which issued Dec. 31, 1974, while another is taught by C. Y. Lee in his commonly assigned U.S. patent application Ser. No. 965,453, filed Nov. 30, 1978, both of which are expressly incorporated by reference.

The following discussions describe the method of manufacturing the above described pressure capsule 100 and consists primarily of four major procedures: (1) surface preparation which ensures the required surface flatness and smoothness of the respective quartz plates or discs 102, 104; (2) silk screen printing and curing of the electrodes, contacts, ground shield, (3) silk screening of the frit glass and preglazing to drive off the organic binders contained in the frit glass material and (4) the vacuum sealing of the pressure capsule.

The fabrication process begins by preparing quartz blanks which in the preferred embodiment are disc-like structures having a one inch diameter with flat areas (see FIGS. 7 and 8) ground on opposing sides or ends. The parallel surfaces (120, 122, 124, 126) of the discs are also ground to ensure a determinable flatness. It has been found that a deviation from flat across these surfaces of the disc should be less than 5,000 angstroms. After grinding, the quartz discs are cleaned and air fired to 900° C. After air firing the electrical elements (electrodes, contacts and ground shield) of each disc are silk screened thereon and the electrical elements cured. The material used for the electrodes and ground shield is a metal organic ink A-1830 manufactured by the Ingelhart Corporation, New York City, N.Y. The metal organic ink is a platinum gold combination held in suspension by organic binders. The primary constituents of this metal organic ink comprises: 15.0% Au, 2.0% Pt and 0.066% Rh.

The first silk screen printing operation can place the ground shield 116 on surface 126 of the quartz disc 104. This ground shield 116 is air dried in a suitable furnace (not shown). The air drying could be performed between the temperature range of 100° C. to 150° C. and it has been found that a drying time of 15 minutes is adequate. The furnace can be a simple box type furnace of the type having a predetermined but variable temperature therein and means for enriching the environment by injecting oxygen ($O_2$) therein. Alternatively, the furnace may be an automated belt furnace having a plurality of temperature zones and having the above oxygen enrichment features and further having conveyor means or a belt for transporting the parts to be processed into and out from these temperature zones.

Figure 12:
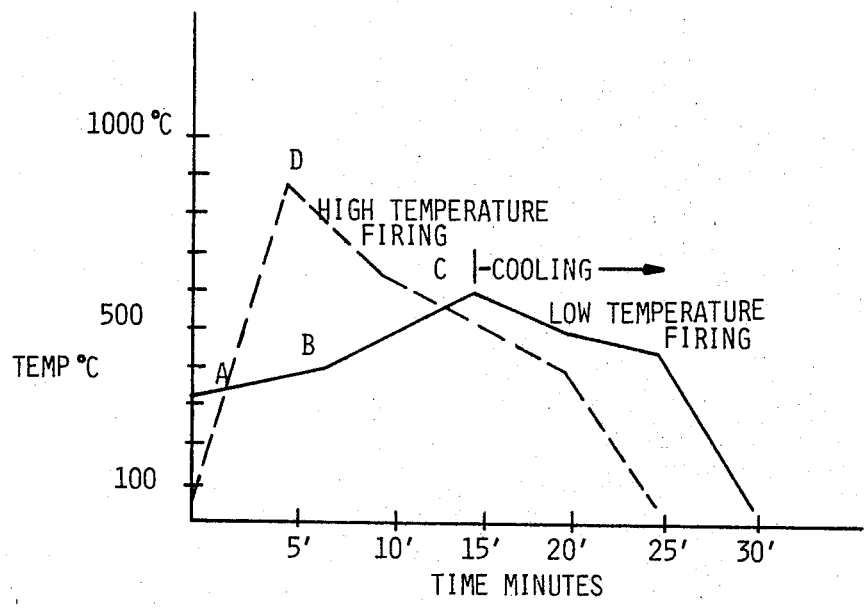
FIG. 12 illustrates the electrode curing process.
Figure 13:
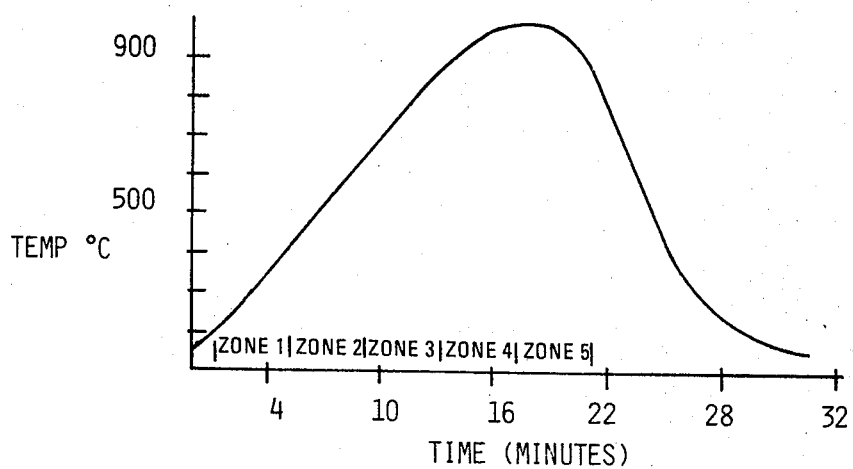
FIG. 13 illustrates an alternate electrode curing process.

After the air drying step, the ground shield 116 may first be cured or alternatively returned to the silk screen printer prior to curing where the $C_p$-$C_r$ electrodes, i.e.

electrodes 112 and 114, are printed on the flat surface 124 and then this combination is now similarly air dried. The disc 104 is returned to the furnace for the electrode curing procedure. The curing procedure is a two-step process which first requires that the organic binders in the ink forming the electrodes and other electrical elements be driven off, and secondly to securely attach (i.e., fused) the remaining material to the quartz. During the curing process, the thickness of the remaining electrode materials are reduced to a thin film having an average thickness of 18KA. The curing process can be implemented as a number of distinct procedures as illustrated in FIG. 12 or as an equivalent longer single procedure as illustrated in FIG. 13. The choice of implementation will depend primarily upon the type of furnace employed.

Reference is again made to the curing procedure illustrated in FIG. 12. This procedure is designed to be implemented in a box type of furnace and shows the desired electrode temperatures as a function of time. The procedure comprises a first curing step which is a low temperature firing (solid lines) followed by a high temperature firing (dashed lines). The quartz plate having the designated electrodes thereon is inserted into the furnace which is preheated to a first temperature such as 300° C. The quartz plate (and electrode) rapidly achieves this first temperature (Point A).

The furnace temperature is increased to a higher level. The electrode temperature gradually approaches this higher temperature (Point B) and during this time, a large percentage of the hydrocarbons in the electrode material are burned off. It is noted in passing that the furnace should be adequately ventilated to permit these fumes to escape. The furnace temperature is again elevated to an even higher temperature such as 600° C. The electrode temperature will again increase approaching 600° C. (Point C). During this phase, additional organic material is liberated from the electrodes (or other electrical elements such as the ground shield 116 being processed). Upon achieving this higher temperature, the electrode is slowly cooled as illustrated in FIG. 12. As will be shown later, it is possible to eliminate the cooling and proceed directly to the high temperature firing.

After cooling, the quartz plate is placed into a furnace which is preheated to about 900° C. (more specifically 884° C.). This temperature corresponds to the electrode fusing temperature. Depending upon the amount of air within the furnace it may be necessary to enrich the atmosphere therein with oxygen. The high temperature firing process of FIG. 12 was performed in a 1-5 torr oxygen enriched environment. After the electrode (i.e., quartz plate) achieves this temperature (Point D) the quartz plate is cooled by reducing the furnace temperature as indicated in FIG. 12.

Reference is now made to FIG. 13 which illustrates an alternate curing procedure designed for a multi-zone belt furnace. The furnace (not shown) comprises at least five temperature zones and a moveable belt to transport the quartz plates being processed into the various zones. The temperature of the various zones and belt speed are chosen to achieve the results of the previously described segmented curing process, that is, to permit sufficient time for the electrodes to heat up and achieve a temperature which encourages the burning off of the organic materials (approximately 600° C.) and then to permit the electrode material to fuse to the quartz by controlling the rate of temperature increase to approximately 900° C. It should be appreciated that the burn-off temperature, the fusing temperature and heating time in the procedures illustrated in FIGS. 12 and 13 are interrelated so that the above procedures are not limited to the exact time-temperature profiles are shown. As an example, it is conceivable that the driving off of the organic binders can be achieved between 500° C. and 700° C. with appropriate changes in the heating time. With similar changes in heating times the fusing temperature might vary between 800° C. to 1,000° C. In addition, the temperature and heating times could be affected by the varying thermal mass presented by different quantities of quartz discs being processed, holding fixtures (if required) and the size of the furnace.

The curing process of FIG. 13 has been implemented by setting the belt speed to speeds between 3 and 5 inches per minute and by preheating the zones to the following temperatures: zones 1 and 2: 350°-625° C., zone 3: 650°-800° C., zone 4: 950°-1000° C., and zone 5: 925°-950° C. The following zonal temperatures and belt speed appears to yield good quality cured electrodes; zones 1 and 2: 350° C., zone 3: 650° C., zone 4: 950° C., zone 5: 925° C., and belt speed: 3.5 inches per minute. The furnace employed to achieve the temperature profile shown in FIG. 13 is a continuous belt furnace having 5 temperature zones with each zone approximately 30 inches long. This furnace is manufactured by Bruce Industrial Controls, Inc., North Billerica, Mass. and is sufficiently large that oxygen enrichment is not a necessary requirement. In addition to the five heating zones within the curing furnace, the furnace contains a water-cooled heat exchanger located after zone 5. The quartz plates are cooled by moving them through this heat exchanger portion.

A further step towards achieving a fully automated mass production curing procedure is to eliminate the handling of the quartz plates after the printing step or at least between the air drying step and the introduction of the quartz plates into the curing furnace. This can be achieved by having the air drying furnace located at the input end but spaced from the multi-zone curing furnace. The conveyor belt is then extended through the air drying furnace. In this manner, after the electrode material has been printed on the quartz plate, the plate is placed on the conveyor and moved through the drying furnace for the required drying time. These plates will be cooled somewhat as they are moved through the space between both furnaces. After this, the plates proceed into the curing furnace and are cured as described above.

The disc 104 (and/or second disc 102) is returned to the silk screen printer and the ring of frit glass 106 is printed around the electrodes 112, 114 having a diameter slightly larger than the outside diameter of the circular portion of the ground electrode 110. The preferred embodiment uses a slurry frit (P-1015) manufactured by the Vitta Corporation of Danbury Ct. This frit material was chosen because it has a coefficient of thermal expansion which is compatible to the coefficient of thermal expansion of fused quartz. The frit glass material has a viscosity of approximately 200 centi-stokes which permits the silk screening of the frit around the combination $C_p$-$C_r$ electrode. The printed frit is then air dried at 120° C. for about 15 minutes. The thickness of the frit is controlled using standard silk screening techniques, such as controlling the size of the mesh used and the amount of frit glass material printed. Following the drying of the quartz disc having the ring of frit glass 106 imprinted thereon, the quartz disc 104 is placed face-up onto a carrier and again loaded into the furnace having an oxygen enriched atmosphere. The temperature of the furnace is increased from room temperature to about 900° C., more particularly 884° C. The temperature of the furnace is controlled so that the plate 104 temperature increases from ambient to 900° C. and takes between 6 to 7 minutes. Alternatively, the high temperature curing procedure (FIG. 12) can be used here. This procedure drives off the organic binders in the frit material and reduces the frit to a glass phase. The significance of the preglazing procedure can be appreciated in the following context. If the quartz plates are positioned face to face and sealed without a preglazing procedure, at some time during the sealing process, the organic binders, which are still in the frit material, will produce a bubble structure. The bubble structure will be non-uniform and vary from one pressure capsule to the next, thus making it virtually impossible to achieve a repeatable and mass produced pressure capsule 100. However, the preglazing of the frit glass material prior to sealing of the capsule 100, maximizes the amount of organic binders liberated from the frit glass and reduces the bubble structure caused by the reduction of the metal oxides within the frit, thus enhancing the capsule to capsule uniformity. By reducing the bubble structure to a minimum, one inherently achieves a means of temperature stabilizing the pressure capsule 100. A substitute preglazing procedure would be to subject the frit to the time-temperature profile or modified profile such as illustrated in FIG. 13.

The second quartz disc 102 having the circular ground electrode 110 and contact pads 128 are similarly printed, air dried and air fired and cured.

The vacuum sealing of the pressure capsule 100 is accomplished in the following manner. The quartz disc 104 which contains the $C_p$-$C_r$ electrode and the quartz disc 102 containing the ground electrode 110 are placed within a registration fixture 175. The registration fixture 175 is illustrated in FIGS. 9–11 and is discussed in detail later. The registration fixture 175 permits the two quartz discs 102 and 104 to be placed face to face but rotated a determinable amount (90° to the preferred embodiment) relative to one another. The registration fixture 175 surrounds the pressure capsule 100 with a heat absorbing mass during the sealing process to produce a uniform radiation pattern for the heating and sealing of the pressure capsule 100. A single registration fixture 175 or a plurality of such fixtures and associated pressure capsules 100 are stacked on a quartz boat or moveable tray (not shown) having a thermocouple and loaded into the diffusion furnace (not shown).

Reference is now made to FIG. 14 which shows the temperature-pressure profile used to vacuum seal each pressure capsule 100 and achieve a determinable vacuum pressure therein. FIG. 14 illustrates the designed pressure profile and two temperature profiles both of which have yielded acceptable results. The first profile (lines A and B of FIG. 14) requires a monotonic temperature increase over a predetermined period followed by a cooling period. The second profile (lines C and B) illustrate a discontinuous temperature profile followed by the same cooling period.

After the registration fixture 175 containing an appropriate number of unsealed pressure capsules 100 is loaded into a first ambient temperature zone of a diffusion furnace (not shown) the furnace is then sealed and evacuated from atmospheric pressure to a first determinable pressure level. The magnitude of this first pressure level is sufficiently low to encourage the outgassing of the organic materials which remain in the electrode or frit material. By removing these gases and the bubbles which might form the temperature coefficient of the capsule is stabilized. The first pressure level should be as low as possible, however, 0.05 torr appears to be adequate. After the furnace has stabilized at the first pressure level, the pressure within the unsealed pressure capsule 100, i.e. within the interior chamber 148 (intermediate the quartz discs 102 and 104 and the circular frit disc 106) will similarly arrive at this lower first pressure level. The registration fixtures 178 and capsules 100 are then subjected to one of the temperature profiles shown in FIG. 14. The following discussion illustrates the discontinuous temperature process and further presumes that the sealing process is done within a diffusion furnace of the type having at least three temperature zones. The temperatures within each zone will depend upon the characteristics of the metal-organic ink and the frit glass material. The first temperature zone is maintained at ambient temperature while the second temperature zone is maintained at a level chosen to permit the outgassing of entrapped gases which remain within the frit material and metal-organic ink. The third temperature zone is chosen at a level which will change the frit material to a viscous glass state in a predetermined time interval; in the preferred embodiment the third temperature approximately 900° C. At this temperature, it was found that the Vitta frit material rapidly achieves a molten state.

The registration fixtures are then immediately moved (see FIG. 14) into the second temperature zone wherein the temperature of the unsealed quartz capsules 100 will increase to the second temperature level. The unsealed pressure capsules will be maintained within the second temperature zone for a period of time $T_1$ to allow entrapped gases to degas. It has been found that a degassing period of twelve to twenty minutes (depending on thermal mass or load) provides an adequate degassing interval. After the degassing step, the registration fixtures (and unsealed pressure capsules 100) are now moved into the third temperature zone for a period of time $T_3$, wherein the furnace pressure is increased to a slightly greater pressure such as 1–8 torr of $O_2$. This increased pressure level decreases the possibility of causing the oxides within the frit material to reduce and become conductive. In addition, this pressure level determines the final pressure, (measured at room temperature) to be achieved within the capsule 100 after the capsule is sealed and cooled. The rate of temperature increase of the capsules 100 is monitored and the third temperature level should be attained within a 6–7 minute interval. After the frit has achieved a molten state (Point D, FIG. 14) the pressure within the diffusion furnace is increased to a third pressure level approaching atmospheric pressure. It is not necessary however, to achieve atmospheric pressure; a third pressure level of 700 torr is sufficient. At this pressure level, the increased pressure provides a clamping force of approximately 4.5 Kg (10 lbs.) on each flat surface of the pressure capsule 100 therein compressing the frit 106 to its final height. Higher clamping forces however, can be achieved by increasing the pressure in excess of atmospheric. By utilizing the pressure profile as shown in FIG. 14 to provide a clamping force on the pressure capsule, negates the requirement for having large thermal masses such as large hold-down weights within the furnace, therein reducing the process time and permitting the rapid and mass production of the pressure capsules. It is desirable however, to introduce a small holddown weight of approximately 270 gm. on top of the uppermost registration fixture to further secure the registration fixture to the pressure capsules 100 during the entire vacuum sealing process and to initially compress the frit glass 106. After the pressure within the furnace is increased to the third pressure level, it is rapidly decreased to an intermediate fourth pressure level such as 40 torr. It is required that the fourth pressure level be greater than the pressure internal to the capsule 100. The registration fixtures 175 are then moved to the first temperature zone and allowed to cool. It is sufficient to let the pressure capsules cool to a temperature which is less than 470° C. At this temperature, the pressure within the furnace is raised to atmospheric pressure and the sealed pressure capsules removed.

It should be noted that when the furnace pressure is raised to the third pressure level the pressure exterior to the pressure capsule is significantly greater than the internal pressure of the interior chamber 148. During this time, the viscous frit material will prevent any substantial oxygen penetration. As previously recited, after clamping, that is after the application, of the clamping pressure the furnace pressure was immediately reduced to a lesser fourth pressure level therein further minimizing the possibility of oxygen penetration within the interior of the pressure capsule. It should be apparent that at the third pressure level, the clamping force will deform the capsule 100 from its desired parallel configuration. The capsule deformation may cause portions of the molten frit glass 106 to achieve an uneven thickness since the frit glass 106 is by now attached to and moveable with the quartz plates 102 and 104. If capsule 100 were permitted to cool in this deformed state, the measurement characteristics of the capsule 100 would be effected. Consequently, the fourth pressure level is chosen to permit the plates (102 and 104) to return to a parallel orientation.

Reference is again made to FIGS. 9, 10 and 11 which illustrate the features of the registration fixture 175 and illustrate a method of stacking a plurality of registration fixtures one on to another to permit the mass vacuum sealing of a plurality of pressure capsules 100. Registration fixture 175 comprises a plurality of thin metal plates 176 fabricated from a steel such as the rolled alloy 330 (RA 330) having an upper surface 180 and a parallel lower surface 182. Each surface contains a pressure capsule receiving cavity 184 or 186, respectively. The dimensions of the pressure receiving cavities 184 and 186 conform to the shape of the quartz plates or discs 102 and 104 and are sized to closely receive each disc 102 and 104. In addition, the depth "d" of each pressure capsule receiving cavity (184, 186) is chosen so that when the quartz disc having electrodes or frit imprinted thereon is placed therein, a portion of the quartz discs will protrude therefrom. The pressure capsule receiving cavities 184 and 186 on the upper and lower surface 180 and 182 of each plate 176 are oriented relative to one another to permit the alignment of the flat ends 132, 150 (i.e., cut-outs) to the electrical contacts 120, 140 and 146. In the preferred embodiment, the pressure capsule receiving cavities 180 and 182 are rotated 90° relative to each other to permit the desired perpendicular placement of the plurality of electrical contacts.

The loading or the stacking of each pressure capsule 100 within the registration fixture is performed in the following manner. A cured and preglazed disc such as disc 104 is placed into the upper pressure capsule receiving cavity 182 of one of the registration fixture plates such as plate 176a. The second cured disc 102 is placed within the lower receiving pressure capsule receiving cavity 186 of a second plate such as plate 176b. The plates 176a and 176b having the quartz plates 102, 104 respectively with the electrode surfaces protruding therefrom and are laid one onto the other to achieve the 90° mounting relationship of the electrodes 110, 112, and 114. By repeating the above stacking procedure a plurality of pressure capsules 100 can be assembled in stacked relationship within the registration fixture 175.

To achieve the alignment of each metal plate 176 and therefore the alignment of each disc 102 to the opposing disc 104 every metal plate 176 is fabricated with an set of alignment holes 190 adapted to receive an alignment pin 192. The alignment pin 192 is fabricated from the same metal used for the metal plate 176. To enhance the uniform heating of the pressure capsule 100 by the registration fixture 175, it is preferable to heat treat the registration fixture 175 (i.e., each plate 176) to develop an oxide layer throughout.

Reference is now made to FIG. 15 and 16 which illustrates an alternate embodiment of the pressure capsule 100. In particular, there is shown a circular pressure capsule 154 having a circular upper plate or disc 156 and circular lower plate or disc 158. The arrangement of the electrodes 110, 112, and 114 thereon remains as previously described in the preferred embodiment. However, the electrical contacts 140 and 146 are no longer oppositely situated but rather skew oriented relative to one another; the circular ground electrode 110 is in electrical communication with only one electrical contact 128 which is uniformly positioned between contacts 140 and 146. In addition, the upper plate or disc 156 contains a single cut-out 160a while the lower plate or disc 158 contains a plurality of cut-outs such as cut-outs 160b, and c. Each cut-out 160a-c is located on its respective disc to expose an oppositely situated electrical contact (128, 140 or 146) located and the opposing disc.

Many changes and modifications in the above described embodiment of the invention can of course be carried out without parting from the scope thereof. Accordingly, that scope is intended to be limited only by the scope of the appended claims.

Having thus described the invention, which is claimed is:

1. A method of fabricating a pressure capsule comprising:
    1.1 providing two flexible quartz plates having electrodes thereon, wherein the electrodes form the elements of a pressure sensitive capacitor;
    1.2 applying a dielectric sealing glass material, having a predetermined viscosity, to at least one of said quartz plates in the shape of a peripheral seal;
    1.3 positioning said quartz plates with said dielectric therebetween in a substantial parallel orientation, at an initial spacing determined by the height of said dielectric;
    1.4 decreasing the local pressure proximate the capsule from atmospheric pressure to a lower first pressure level thereby similarly reducing the pressure within the capsule to the first pressure level;

1.5 monotonically increasing the local temperature to a temperature level to reduce the dielectric to a molten glaseous state to encourage outgassing of an organic matter contained in the electrode or dielectric to a molten state;

1.6 increasing the local pressure, in an oxygen enriched environment, to a second pressure level between the range of 1-8 torr of oxygen, to prevent any oxide material in the dielectric from becoming conductive thereby causing an electrical short circuit between the electrodes;

1.7 varying the separation between the plates by clamping the plates together reducing the thickness of the dielectric by increasing the local pressure to a third pressure level after the dielectric has attained said molten state.

2. The method as recited in claim 1 wherein said third pressure level is approximately atmospheric.

3. The method as recited in claim 1 further including the following steps:

3.1 decreasing said local pressure to a fourth pressure level intermediate said first and said third pressure levels;

3.2 cooling the capsule;

3.3 increasing said local pressure to atmospheric after the capsule has cooled.

4. The method as recited in claim 1 wherein said second temperature level is between 650° C.-800° C. and said third temperature level is between 800° C.-1,000° C. and said first pressure level is between 8.0 torr and absolute vacuum, and said second pressure level is between 1.0 torr and 40 torr; and said third pressure level is between 500 torr and atmospheric pressure and said fourth pressure level is between 500 torr and 1.0 torr.

5. The method as recited in claim 1 wherein;
said second temperature level is 700° C. and
said third temperature level is 900° C. and
said first pressure level is 0.5 torr and
said second pressure level is 1.0 torr and
said third pressure level is 700 torr and
said fourth pressure level is 40 torr.

6. The method as recited in claim 5 including the additional step of compressively loading said plates prior to the step of decreasing the local pressure.

7. The method as defined in claim 1 wherein said predetermined viscosity is approximately 200 centistokes.

8. A method of mass producing a plurality pressure capsules comprising:

8.1 providing a pair of flexible quartz plates for each capsule having electrodes thereon, wherein the electrodes for the elements of a pressure sensitive capacitor;

8.2 applying a dielectric sealing glass material having a predetermined viscosity to at least one of said quartz plates of each capsule in the shape of a peripheral seal;

8.3 positioning said quartz plates of each capsule with said dielectric therebetween in a substantial parallel orientation at an initial spacing determined by the height of said dielectric;

8.4 placing the capsule in the first temperature zone having a first temperature level which is substantially ambient;

8.5 increasing the capsule temperature by moving the capsule to a temperature zone having a higher temperature level to permit the dielectric to reduce the dielectric to a molten glaseous state;

8.6 decreasing the furnace pressure from atmospheric pressure to a lower first pressure level thereby similarly reducing the pressure within each capsule to the first pressure level;

8.7 permitting entrapped gases within the dielectric to outgas;

8.8 clamping the plates by increasing the furnace pressure to a second level to reduce the thickness of the dielectric after the dielectric has attained said molten state;

8.9 decreasing said furnace pressure to a third pressure level intermediate said first and said second pressure levels;

8.10 cooling the capsule by moving the capsule to said first temperature zone;

8.11 increasing the furnace pressure to atmospheric pressure.

9. The method as recited in claim 1 or 8 wherein said step of clamping includes increasing said furnace pressure to a third pressure level that is less than or equal to atmospheric pressure.

10. The method as recited in claim 10 wherein said third pressure level is 700 torr.

11. The method as defined in claim 8 wherein said predetermined viscosity is approximately 200 centistokes.

12. A method of fabricating a pressure capsule comprising:
providing two flexible quartz plates having electrodes thereon, wherein the electrodes form the elements of a pressure sensitive capacitor;
applying a dielectric sealing glass material having a predetermined viscosity to at least one of said quartz plates in the shape of a perimetal seal;
positioning said quartz plates with said dielectric therebetween in a substantial parallel orientation, at an initial spacing determined by the initial height of said dielectric;
decreasing the pressure within the volume between said plates and said dielectric to a first pressure level that is sufficiently low to encourage outgassing of air entrapped within said dielectric and the electrode material;
heating said plates to reduce said dielectric to a molten state;
achieving the final spacing between said plates by clamping said plates together to compress the thickness of said dielectric by momentarily increasing the pressure proximate said plates to substantially atmospheric pressure after said dielectric has achieved a molten state.

13. The method as defined in claim 12 further including, after the step of heating;
preventing said dielectric from exhibiting electrically conductive characteristics by increasing the pressure between said plates, in an oxygen enriched environment, to a second pressure level of 1-8 torr of oxygen.

14. The method as defined in claim 13 wherein said second pressure level is slightly greater than said first pressure level.

15. The method as defined in claim 12 further including:
permitting said plates to achieve a final parallel orientation and establishing a reference pressure between said plates by pressurizing the volume between said plates to an intermediate pressure level, wherein said intermediate pressure level is between 8 torr and atmospheric.

16. The method as recited in claims 12 or 15 wherein said intermediate pressure level is 40 torr.

17. The method as defined in claim 12 wherein said predetermined viscosity is approximately 200 centistokes.

* * * * *